US012686362B2

(12) United States Patent
Lidström et al.

(10) Patent No.: US 12,686,362 B2
(45) Date of Patent: Jul. 21, 2026

(54) BATTERY MANAGEMENT SOFTWARE RESET

(71) Applicant: VOLVO TRUCK CORPORATION, Gothenburg (SE)

(72) Inventors: Emil Lidström, Torslanda (SE); Poojashree Holalu Shivaramegowda, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 112 days.

(21) Appl. No.: 18/750,142

(22) Filed: Jun. 21, 2024

(65) Prior Publication Data

US 2025/0001973 A1 Jan. 2, 2025

(30) Foreign Application Priority Data

Jun. 29, 2023 (EP) ..................................... 23182428

(51) Int. Cl.
B60R 25/40 (2013.01)
B60R 25/24 (2013.01)

(52) U.S. Cl.
CPC ............ B60R 25/403 (2013.01); B60R 25/24 (2013.01)

(58) Field of Classification Search
CPC .............................. B60R 25/403; B60R 25/24
See application file for complete search history.

(56) References Cited

U.S. PATENT DOCUMENTS 10,181,951 B2 * 1/2019 Adams ....................... H04L 9/14
11,804,083 B2 * 10/2023 Min ......................... E05B 35/12

| | | | | |
|---|---|---|---|---|
| 2011/0270480 A1 * | 11/2011 | Ishibashi | ................. | B60L 50/53 320/135 |
| 2013/0019305 A1 * | 1/2013 | Berenbaum | ............. | G06F 21/44 726/19 |
| 2015/0172054 A1 * | 6/2015 | Prakash | ................ | H04L 9/3263 713/189 |
| 2017/0300313 A1 * | 10/2017 | Gantt, Jr. | ................ | H04L 67/12 |
| 2019/0004784 A1 * | 1/2019 | Rocci | ..................... | B60L 53/60 |
| 2019/0294799 A1 * | 9/2019 | Kumar | .................... | G06F 21/57 |
| 2021/0004882 A1 * | 1/2021 | Nakajima | ............. | G06Q 50/10 |
| 2021/0399566 A1 * | 12/2021 | Visvesha | ................. | B60L 53/65 |
| 2023/0063433 A1 * | 3/2023 | Li | ............................ | G06F 8/65 |

FOREIGN PATENT DOCUMENTS

| CN | 115761994 A | 3/2023 |
|---|---|---|
| EP | 2908193 A2 | 8/2015 |
| EP | 2908193 A3 | 11/2015 |

OTHER PUBLICATIONS

Extended European Search Report in corresponding European Application No. 23182428.5 dated Dec. 7, 2023 (7 pages).

* cited by examiner

*Primary Examiner* — Thomas D Alunkal

(74) *Attorney, Agent, or Firm* — Jeffri A. Kaminski; Venable LLP

(57) ABSTRACT

A computer system of a vehicle has processing circuitry to send a verification request message to an electrical energy storage system of the vehicle, receive a response message from the electrical energy storage system that depends on the existence of a correct digital key in a memory of the electrical energy storage system; when the digital key is correctly verified, allow electrical systems of the vehicle to use the electrical energy storage system, when the digital key cannot be correctly verified, limit the use of the electrical energy storage system for the electrical systems of the vehicle.

16 Claims, 7 Drawing Sheets

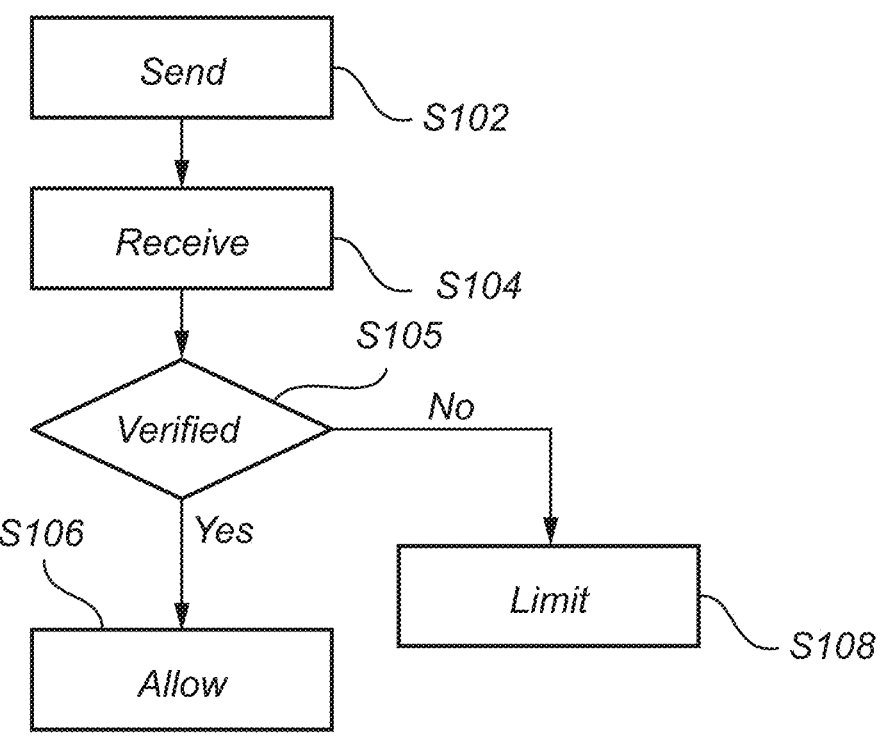
*Fig. 2*
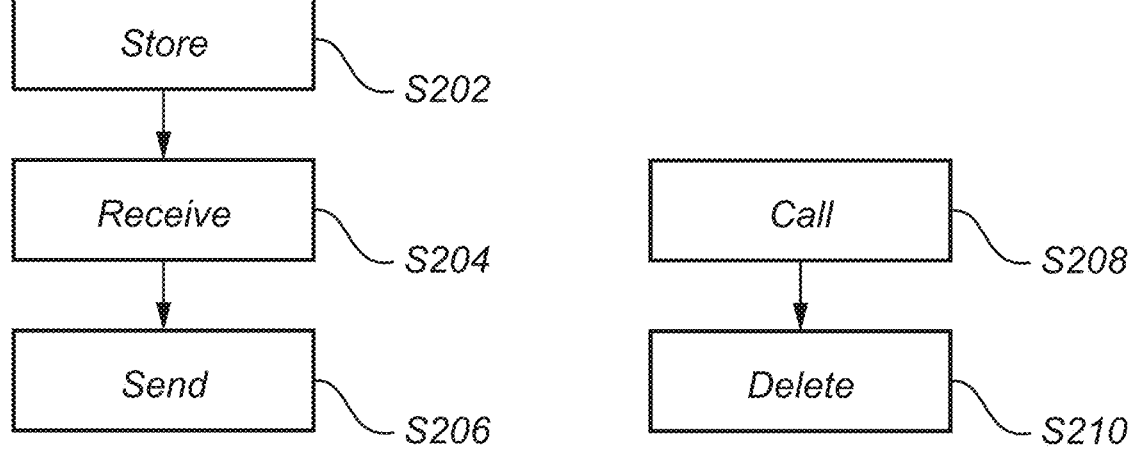
*Fig. 3*                    *Fig. 4*

BATTERY MANAGEMENT SOFTWARE RESET

TECHNICAL FIELD

The disclosure relates generally to software security in vehicle electrical energy storage systems. In particular aspects, the disclosure relates to secure battery management software reset. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Vehicle battery management systems are required to have protection from use of malicious software or third-party software according to UNECE R155 regulation. At the same time, upcoming EU battery regulation will include a requirement for software reset, allowing economic operators to download their own software in battery management systems. These two conflicting requirements have proven complicated to fulfil simultaneously.

SUMMARY

According to a first aspect of the disclosure, there is provided a computer system of a vehicle comprising processing circuitry configured to: send a verification request message to an electrical energy storage system of the vehicle, receive a response message from the electrical energy storage system that depends on the existence of a correct digital key in a memory of the electrical energy storage system; when the digital key is correctly verified, allow electrical systems of the vehicle to use the electrical energy storage system, when the digital key cannot be correctly verified, limit the use of the electrical energy storage system for the electrical systems of the vehicle.

The first aspect of the disclosure may seek to provide a way for the vehicle to verify that the correct digital key is present in the electrical energy storage system to ensure that the software has not been tampered with or to ensure that the software is from an approved source. A technical benefit may include that the vehicle systems can verify the authenticity of the software in the electrical energy storage system. If the key cannot be verified, thus the software is compromised or is not from an approved source, the use of the electrical energy storage system in the vehicle is actively limited or prohibited by the vehicle systems.

Limiting the use may include for example not allowing any charging current to enter the battery, turning off other equipment connected to the electric system, and/or displaying a warning and only allowing a limited amount of drive cycles before repair.

It is noted that a response message can be received but it can be wrong if there is no correct digital key. That is, only in case a valid and expected response is received the digital key is correctly verified.

Optionally, in some examples, including in at least one preferred example, the electrical energy storage system may include a software reset function stored in the memory or accessible as a download file, the software reset function is configured to, upon being called, delete the digital key and a software access protection module from the memory. A technical benefit may include the ability to, after applying the software reset function, use the electrical energy storage system with third party software, but not in the vehicle. In other words, with the digital key being deleted the vehicle can no longer verify the software of the electrical energy storage system. However, with the software access protection module being deleted from the electrical energy storage system, the memory is available for download of third-party software.

Optionally in some examples, including in at least one preferred example, the software access protection module may include one or both of a further digital key and a user authentication block. A technical benefit may include a safe way to ensure software integrity, while at the same time being removable if the software reset function is applied.

Optionally in some examples, including in at least one preferred example, the first digital key may be a vehicle digital key configured to be verified by the vehicle processing circuitry, wherein the electrical energy storage system stores the further digital key that is verifiable for granting access to the memory. That is, a specific vehicle digital key is used that is only verified by the vehicle to verify the software on the memory. The further digital key is for accessing the memory to download new software.

Optionally in some examples, including in at least one preferred example, the further digital key may be deleted when the software reset function is called. That is, the memory is available for downloading of third-party software.

There is further provided a vehicle comprising the computer system.

According to a second aspect of the disclosure, there is provided a computer system of an electrical energy storage system comprising processing circuitry configured to: store, in a memory of the electrical energy storage system, a vehicle digital key verifiable by a vehicle processing circuitry, a software access protection module configured to protect unauthorized access to the memory, and a software reset function, receive a verification request message from the vehicle processing circuitry, send a response message to the vehicle processing circuitry, that: when the vehicle digital key is correctly verified, allows electrical systems of the vehicle to use the electrical energy storage system, when the vehicle digital key cannot be correctly verified, limits the use of the electrical energy storage system for the electrical systems of the vehicle.

The second aspect of the disclosure may seek to provide a way for a vehicle to verify the authenticity of the software in the electrical energy storage system. A technical benefit may include that the vehicle systems can verify the authenticity of the software in the electrical energy storage system. If the key cannot be verified, thus the software is compromised, the use of the electrical energy storage system in the vehicle is actively limited or prohibited by the vehicle systems.

Optionally in some examples, including in at least one preferred example, the processing circuitry may be configured to: receive a software reset signal that calls the software reset function, and in response, delete at least the vehicle digital key from the memory.

Optionally in some examples, including in at least one preferred example, the processing circuitry may be configured to: delete the vehicle digital key and the software access protection module from the memory. A technical benefit may include the ability to, after applying the software reset function, use the electrical energy storage system with third party software, but not in the vehicle. In other words, with the digital key being deleted the vehicle can no longer verify the software of the electrical energy storage system. However, with the software access protection module being deleted from the electrical energy storage system, the memory is available for download of third-party software.

Optionally in some examples, including in at least one preferred example, the software access protection module may include one or both of a further digital key and a user authentication block. A technical benefit may include a safe way to ensure software integrity, while at the same time being removable if the software reset function is applied.

Optionally in some examples, including in at least one preferred example, the user authentication block, and the vehicle key may be deleted when the software reset function is called. That is, the memory is available for downloading of third-party software but is no longer available for full use in the vehicle since the vehicle digital key is deleted.

Optionally in some examples, including in at least one preferred example, the electrical energy storage system may comprise a propulsion battery for the vehicle.

There is further provided an electrical energy storage system comprising a computer system according to the second aspect.

According to a third aspect of the disclosure, there is provided a computer-implemented method, comprising: sending, by a processing circuitry of a computer system, a verification request message to an electrical energy storage system of the vehicle, receiving, by the processing circuitry, a response message from the electrical energy storage system that depends on the existence of a correct digital key in a memory of the electrical energy storage system; when the digital key is correctly verified, allowing, by the processing circuitry, electrical systems of the vehicle to use the electrical energy storage system, when the digital key cannot be correctly verified, limiting, by the processing circuitry, the use of the electrical energy storage system for the electrical systems of the vehicle.

The third aspect of the disclosure may seek to provide a way for the vehicle to verify that the correct digital key is present in the electrical energy storage system to ensure that the software has not been tampered with or is not from an approved source. A technical benefit may include that the vehicle systems can verify the authenticity of the software in the electrical energy storage system. If the key cannot be verified, thus the software is compromised, the use of the electrical energy storage system in the vehicle is actively limited or prohibited by the vehicle systems.

Optionally in some examples, including in at least one preferred example, the digital key may be a vehicle digital key configured to be verified by the vehicle processing circuitry, wherein the electrical energy storage system stores a further digital key that is verifiable for granting access to the memory. That is, a specific vehicle digital key is used that is only verified by the vehicle to verify the software on the memory. The further digital key is for accessing the memory to download new software.

According to a fourth aspect of the disclosure, there is provided a computer-implemented method comprising: storing, by a processing circuitry of a computer system, in a memory of the electrical energy storage system, a vehicle digital key verifiable by a vehicle processing circuitry, a software access protection module configured to protect unauthorized access to the memory, and a software reset function, receiving, by the processing circuitry, a verification request message from the vehicle processing circuitry, sending, by the processing circuitry, a response message to the vehicle processing circuitry, that: when the vehicle digital key is correctly verified, allows electrical systems of the vehicle to use the electrical energy storage system, when the vehicle digital key cannot be correctly verified, causes limitations to the use of the electrical energy storage system for the electrical systems of the vehicle.

The fourth aspect of the disclosure may seek to provide a way for a vehicle to verify the authenticity of the software in the electrical energy storage system. A technical benefit may include that the vehicle systems can verify the authenticity of the software in the electrical energy storage system. If the key cannot be verified, thus the software is compromised, the use of the electrical energy storage system in the vehicle is actively limited or prohibited by the vehicle systems.

Optionally in some examples, including in at least one preferred example, the method may comprise: receiving, by the processing circuitry, a software reset signal that calls the software reset function, and in response, deleting, by the processing circuitry, at least the vehicle digital key from the memory.

Optionally in some examples, including in at least one preferred example, the method may comprise: deleting, the vehicle digital key and the software access protection module from the memory. A technical benefit may include the ability to, after applying the software reset function, use the electrical energy storage system with third party software, but not in the vehicle. In other words, with the digital key being deleted the vehicle can no longer verify the software of the electrical energy storage system. However, with the software access protection module being deleted from the electrical energy storage system, the memory is available for download of third-party software.

There is further provided a computer program product comprising program code for performing, when executed by the processing circuitry, the method of any of any one of the herein disclosed examples.

There is further provided a non-transitory computer-readable storage medium comprising instructions, which when executed by the processing circuitry, cause the processing circuitry to perform the method of any of any one of the herein disclosed examples.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

FIG. 2 is a flow chart according to an example method.

FIG. 3 is a flow chart according to an example method.

FIG. 4 is a flow chart according to an example method.

DETAILED DESCRIPTION

The detailed description set forth below provides information and examples of the disclosed technology with sufficient detail to enable those skilled in the art to practice the disclosure.

Presently, it is required by legislation that software in vehicle electrical energy storage systems be protected from tampering or replacement. In contrast to this, there is a regulation that requires replacement of software to allow secondary use of the batteries. These two aspects are conflicting but desirable to harmonize.

To address this above issue, the present disclosure suggests a digital key in the electrical energy storage system that is explicitly verified by the vehicle at start-up to make sure that the software in the electrical energy storage system is protected. That is, the vehicle processing circuitry performs a verification of the digital key in the electrical energy storage system at every start up.

Figure 1:
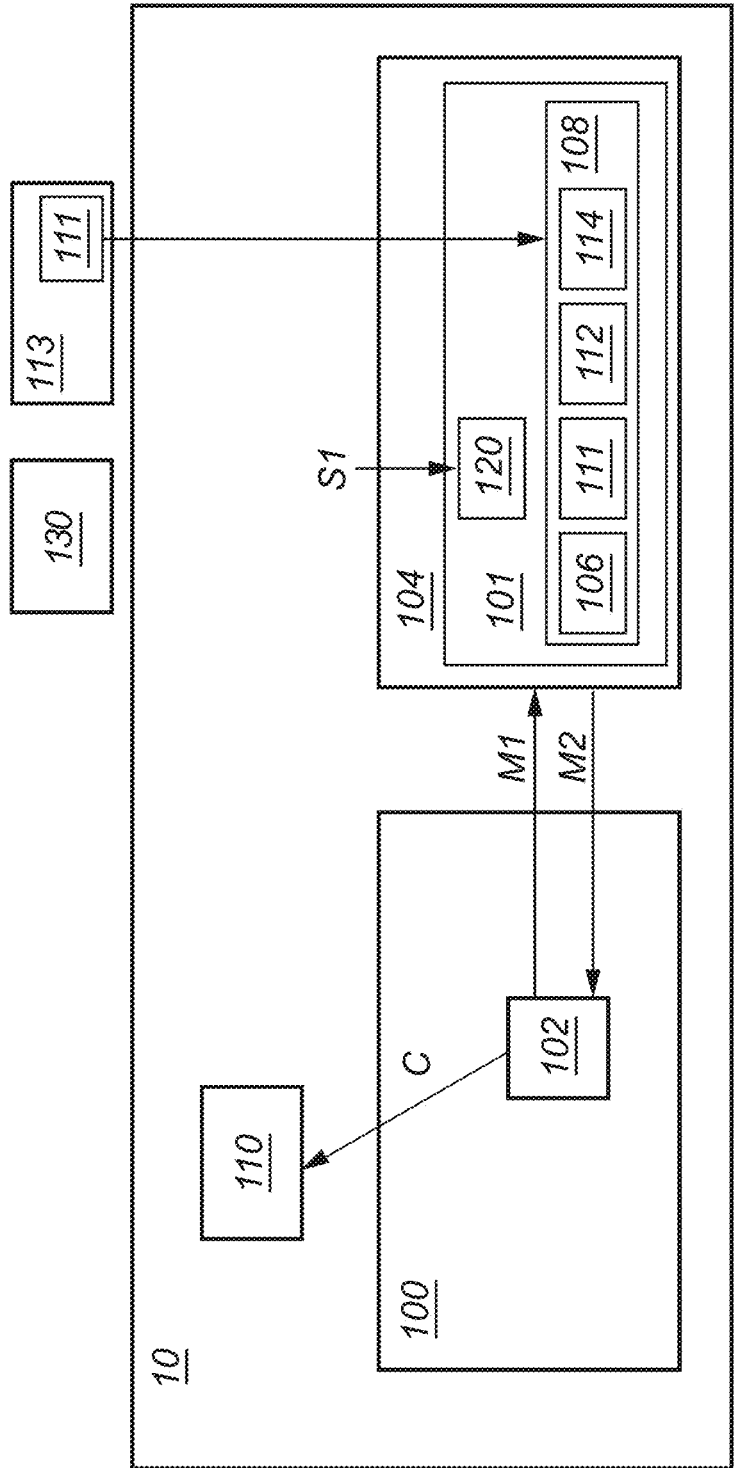
FIG. 1 is an exemplary system diagram of a computer system according to an example.

FIG. 1 is an exemplary system diagram of a computer system 100 of a vehicle 10. The computer system 100 comprises processing circuitry 102 configured to: send a verification request message M1 to an electrical energy storage system 104 of the vehicle 10.

The electrical energy storage system 104 typically include battery cells electrically connected to form battery packs. The electrical energy storage system 104 may comprise a propulsion battery for the vehicle 10.

The electrical energy storage system 104 comprises processing circuitry 120 and a digital memory device 108. The processing circuitry 102 can communicate with the electrical energy storage system 104, e.g., with the processing circuitry 120 of the electrical energy storage system 104 to perform various control actions such as measuring voltage, current through-put, temperature, and other parameters of the electrical energy storage system 104. The processing circuitry 120 and memory 108 may be part of the same chip.

The digital memory device 108 stores a digital key 106 verifiable by the vehicle processing circuitry 102. Furthermore, the digital memory device 108 may store a further digital key 112 verifiable by external parties 130 for accessing the protected memory 108 to download new software, and an authentication block 114 for user authentication. In some possible implementations, the digital key 106 and the further digital key 112 are one and the same single key stored at the same address. However, the digital key 106 and the further digital key 112 may be two separate keys.

A digital key may be for example be realized by a public-private key pair or a common key that is stored in protected areas in both the energy storage system, e.g., in the memory 108, and the vehicle control unit 102.

Authentication software in the electrical processing circuitry 102 may make use of the digital key 106, 112 to generate a message authentication code e.g, random data known by both the vehicle control unit 102 and the processing circuitry 120. The vehicle control unit 102 may decrypt the response M2 using the digital key.

The electrical energy storage system 104 further includes a software reset function 111 that can either be stored in the memory 108, or it can be accessible as a download file 113. The software reset function is configured to, upon being called, delete the digital key 106 and a software access protection module from the memory 108. The software access protection module includes one or both of the further digital key 112 and the user authentication block 114. The user authentication block 114 is a protection layer that requires an external user, for example at a workshop to identify him-/her-self as an authorized user. In order to grant access to download new software, the authorized user must also have the correct key corresponding to the digital key 112. That is, the first digital key 106 is a vehicle digital key configured to be verified by the vehicle processing circuitry 102. The electrical energy storage system 104 stores the further digital key 112 that is used for verifying the external user or authenticate a software download file.

Furthermore, software download integrity may in other possible implementations be assured by signing the software. In this case. the software download file includes, for example, a checksum calculated using a digital key.

Once the software reset function 111 is called and executed, the further digital key 112 is deleted or overwritten.

Turning now to the flow-chart of FIG. 2.

In step S102, sending, by a processing circuitry 102 of a computer system 100, a verification request message M1 to an electrical energy storage system 104 of the vehicle 10. The verification request message may be a challenge response message where the processing circuitry 102 of the vehicle expects a predetermined response for successful verification. The response is determined based on the challenge response message for which a new message is generated each time. Once a new challenge response message is generated, so is also an expected response.

In step S104, receiving, by the processing circuitry 102, a response message M2 from the electrical energy storage system 102 that depends on the existence of a correct digital key 106, in a memory 108 of the electrical energy storage system 104.

When the digital key is correctly verified in step S105, allowing, in step S106, by the processing circuitry 102, electrical systems 110 of the vehicle 10 to use the electrical energy storage system 104. For example, the processing circuitry 102 sends a control message C to activate the electrical systems 110.

When the digital key cannot be correctly verified, limiting in step S108, by the processing circuitry 102, the use of the electrical energy storage system 104 in the electrical systems 110 of the vehicle 10. Limiting the use may include that the processing circuitry does not send a control message to activate the electrical systems 110.

There is further provided a vehicle 10 comprising the computer system 102 and the electrical energy storage system 104. The vehicle may be a truck, a car, a marine vessel, etc.

With further reference to FIG. 1, a computer system 101 of an electrical energy storage system comprises processing circuitry 120 configured to: store, in a memory 108 of the electrical energy storage system 104, a vehicle digital key 106 verifiable by a vehicle processing circuitry 102, a software access protection module 112, 114 configured to protect unauthorized access to the memory 104, and a software reset function 111.

In the flow-chart of FIG. 3, storing in step S202, by a processing circuitry 120 of a computer system, in a memory 108 of the electrical energy storage system 104, a vehicle digital key 106 verifiable by a vehicle processing circuitry 102, a software access protection module 112, 114 configured to protect unauthorized access to the memory 108, and a software reset function 111.

In step S204, receiving, by the processing circuitry 120, a verification request message M1 from the vehicle processing circuitry 102.

Sending in step S206, by the processing circuitry 120, a response message M2 to the vehicle processing circuitry 102, that: when the vehicle digital key 106 is correctly verified, allows electrical systems of the vehicle to use the electrical energy storage system, wherein when the vehicle digital key 106 cannot be correctly verified, the use of the electrical energy storage system for the electrical systems 110 of the vehicle is limited.

Electrical energy storage systems 110 may include e.g. chargers and drive lines of the vehicle. The limitations may include for example prevention of charging, a reduction in max voltage use, maximum power usage, or even a full prevention to extract any power from the electrical energy storage system 104.

When the processing circuitry 120 receives, in step S208 of the flow-chart in FIG. 4, a software reset signal, either from the vehicle 10 itself, or from an external party, the software reset function 111 is called. In response to this, the processing circuitry 120 deletes, in step S210 at least the vehicle digital key 106 from the memory 106.

In some examples, step S210 further includes deleting the vehicle digital key 106 and the software access protection module including one or both of a further digital key 112 and a user authentication block 114 from the memory 108.

There is further provided an electrical energy storage system comprising a computer system 101.

Figure 5:
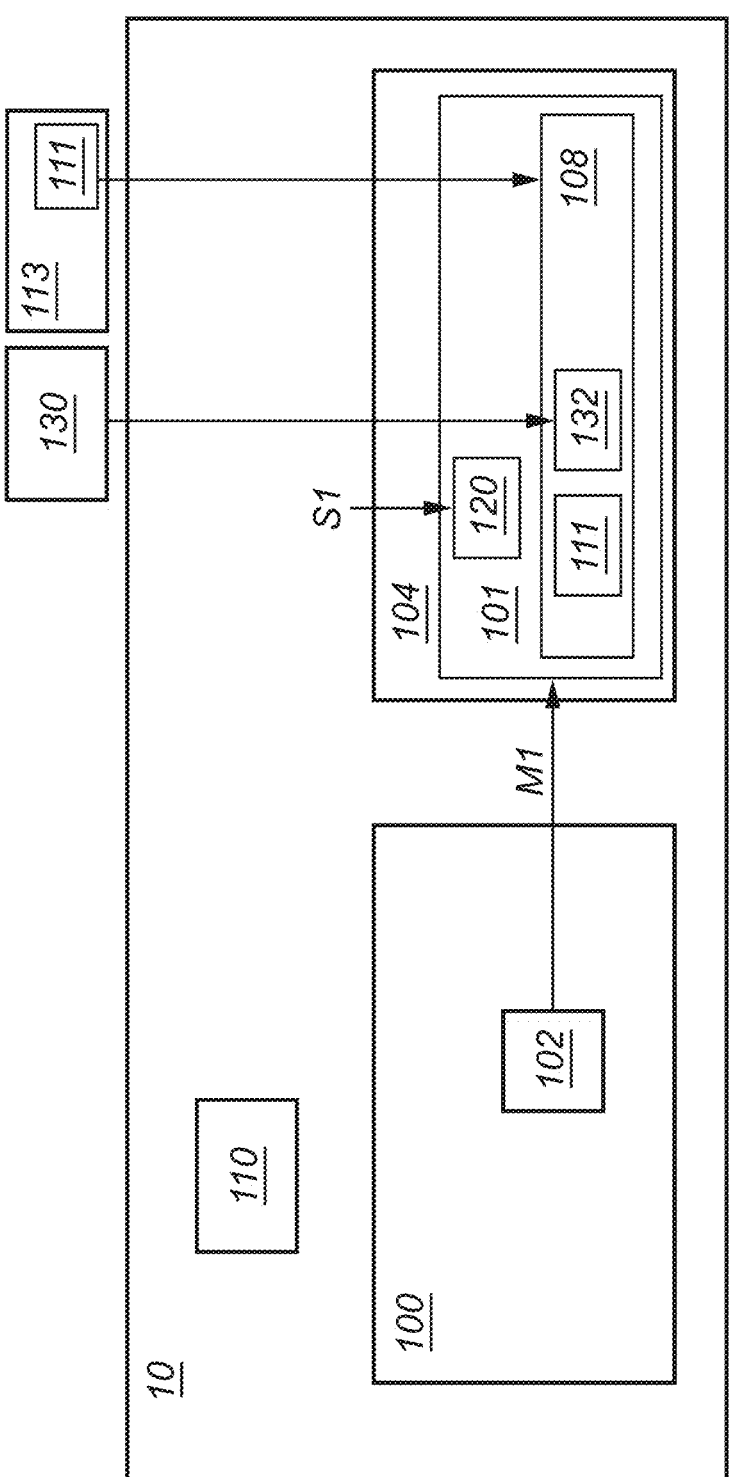
FIG. 5 is an exemplary system diagram of computer systems according to an example.

FIG. 5 is a block diagram of the vehicle 10 after the software reset function 111 was called and applied. Since the vehicle digital key 106 has been deleted from the memory 108, the software validation check performed by the vehicle processing circuitry 102 will fail, and the vehicle electrical systems 110 are not allowed to use, or fully utilize, the electrical energy storage system 104. The processing circuitry sends a control message C to limit the use of the vehicle electrical systems 110. Reduced functionality of the electrical energy's storage system may still be allowed. Furthermore, the software access protection module including one or both of a further digital key 112 and a user authentication block 114 is also deleted from the memory 108, thereby allowing a third party 130 to download new software 132 to the electrical energy storage system 104. This may be performed with the electrical energy storage system 104 in the vehicle 10, but the software reset function may equally well be applied after the electrical energy storage system 104 is removed from the vehicle 10. Note that a response message may be received by the processing circuitry 102 from the electrical energy storage system 104, but this message will not provide for successful verification since the digital keys 106, 112 are deleted from the memory 108.

It is envisaged that in case of the digital key is not successfully verified, a diagnostic flag is set in the vehicle or the electrical energy storage system to indicate a failed key verification. Such flags can be analyzed to better understand the reasons and occurrence for failures, and to select the limitations of use of the electrical energy storage system for the electrical systems of the vehicle. That is, the limitation can be selected based on historical diagnostic flags.

There is further provided a computer program product comprising program code for performing, when executed by the processing circuitry, the method of any one of the herein disclosed examples.

There is further provided a non-transitory computer-readable storage medium comprising instructions, which when executed by the processing circuitry, cause the processing circuitry to perform the method of any one of the herein disclosed examples.

Figure 6:
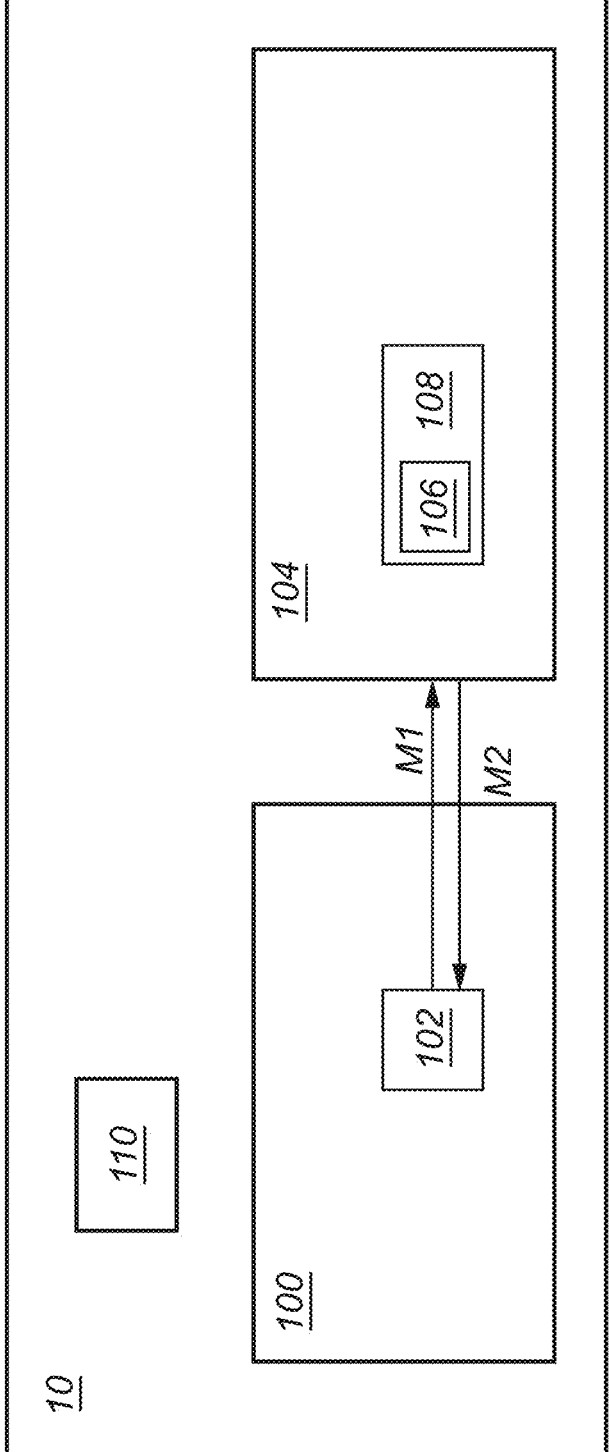
FIG. 6 is another view of FIG. 1, according to an example.

FIG. 6 is another view of FIG. 1, according to an example. A computer system 100 of a vehicle 10 comprising processing circuitry 102 configured to: send a verification request message M1 to an electrical energy storage system 104 of the vehicle, receive a response message from the electrical energy storage system 104 that depends on the existence of a correct digital key 106 in a memory 108 of the electrical energy storage system 104; when the digital key 106 is correctly verified, allow electrical systems 110 of the vehicle to use the electrical energy storage system, when the digital key 106 cannot be correctly verified, limit the use of the electrical energy storage system 104 for the electrical systems 110 of the vehicle.

Figure 7:
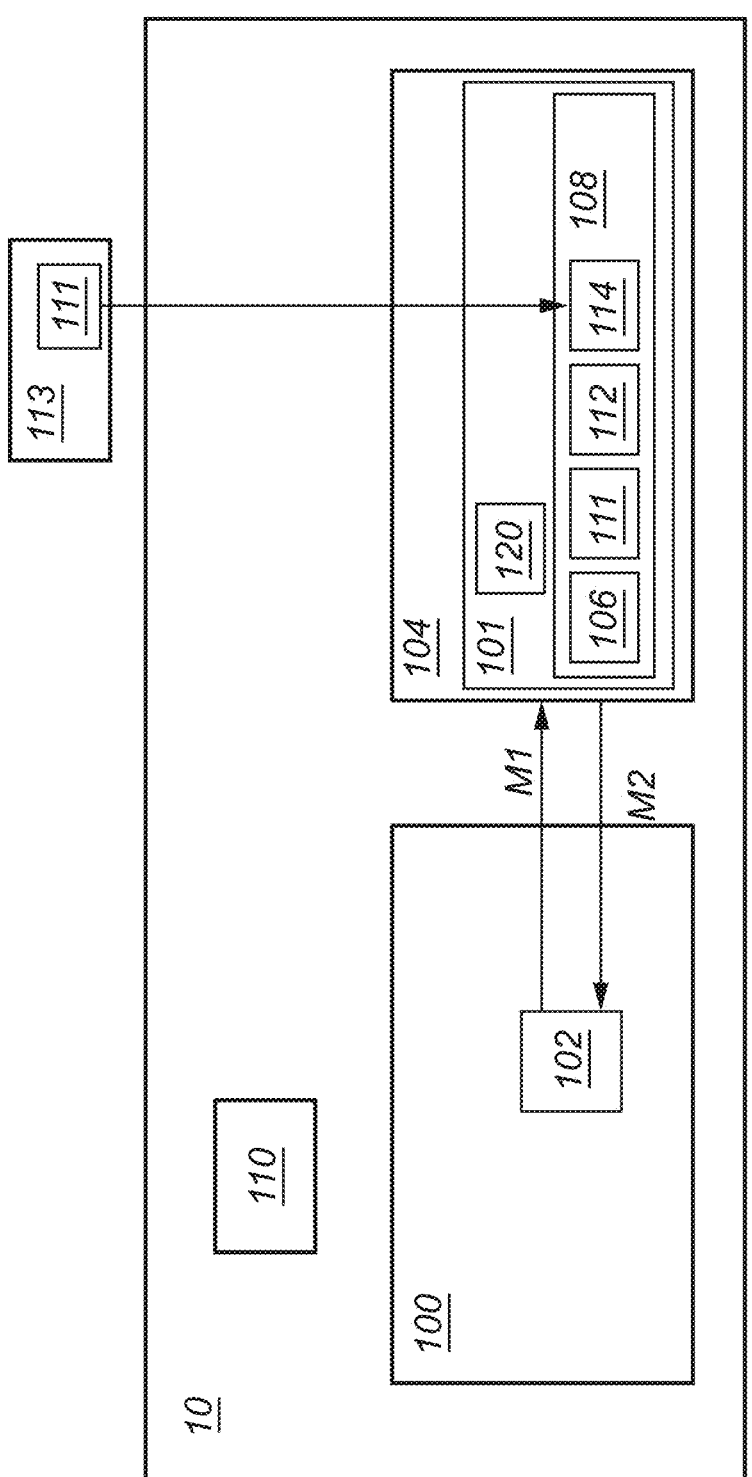
FIG. 7 is another view of FIG. 1, according to an example.

FIG. 7 is another view of FIG. 1, according to an example. A computer system 101 of an electrical energy storage system comprising processing circuitry 120 configured to: store, in a memory 108 of the electrical energy storage system 104, a vehicle digital key 106 verifiable by a vehicle processing circuitry 102, a software access protection module 112, 114 configured to protect unauthorized access to the memory, and a software reset function 111, receive a verification request message M1 from the vehicle processing circuitry 102, send a response message M2 to the vehicle processing circuitry, that: when the vehicle digital key is correctly verified, allows electrical systems of the vehicle to use the electrical energy storage system, when the vehicle digital key cannot be correctly verified, causes limitations of the use of the electrical energy storage system for the electrical systems of the vehicle.

Figure 8:
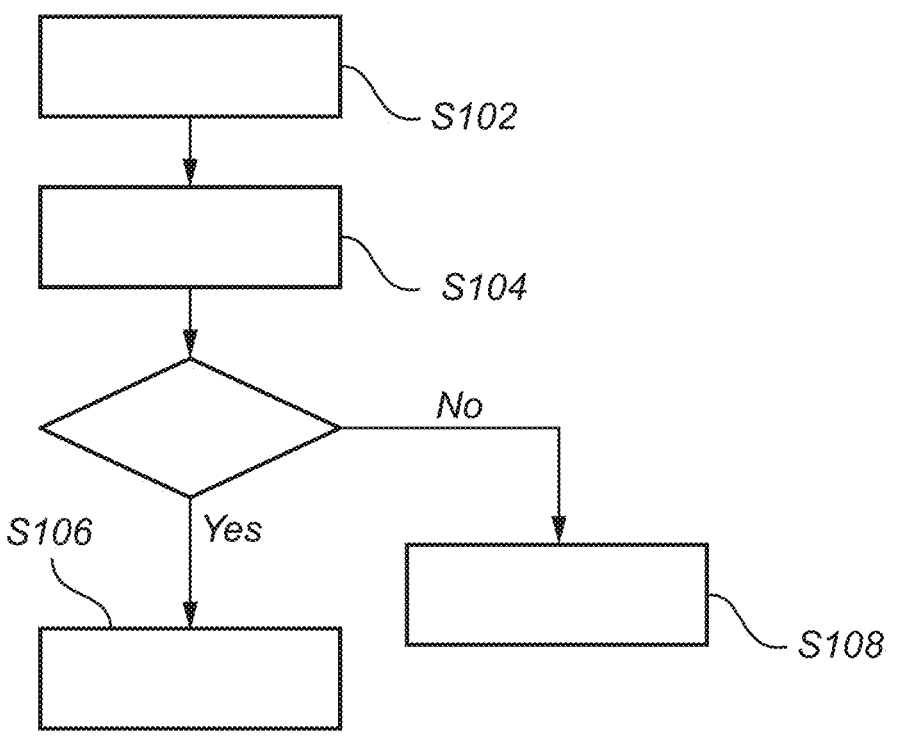
FIG. 8 is a flow chart of an exemplary method.

FIG. 8 is a flow chart of a method comprising sending S102, by a processing circuitry of a computer system, a verification request message to an electrical energy storage system of the vehicle, receiving S104, by the processing circuitry, a response message from the electrical energy storage system that depends on the existence of a correct digital key in a memory of the electrical energy storage system; when the digital key is correctly verified, allowing S106, by the processing circuitry, electrical systems of the vehicle to use the electrical energy storage system, when the digital key cannot be correctly verified, limiting S108, by the processing circuitry, the use of the electrical energy storage system for the electrical systems of the vehicle.

Figure 9:
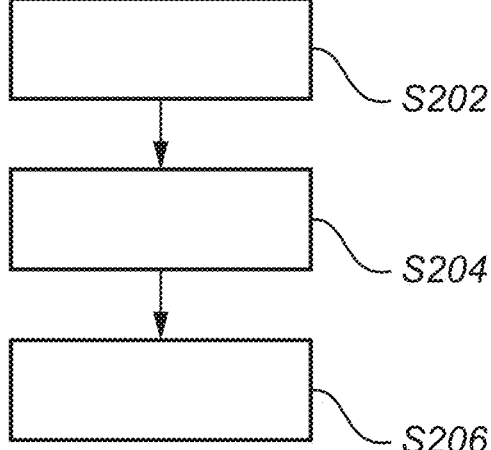
FIG. 9 is a flow chart of an exemplary method.

FIG. 9 is a flow chart of a method comprising storing S202, by a processing circuitry of a computer system, in a memory of the electrical energy storage system, a vehicle digital key verifiable by a vehicle processing circuitry, a software access protection module configured to protect unauthorized access to the memory, and a software reset function, receiving S204, by the processing circuitry, a verification request message from the vehicle processing circuitry, sending S206, by the processing circuitry, a response message to the vehicle processing circuitry, that: when the vehicle digital key is correctly verified, allows electrical systems of the vehicle to use the electrical energy storage system, when the vehicle digital key cannot be correctly verified, limits the use of the electrical energy storage system for the electrical systems of the vehicle.

Figure 10:
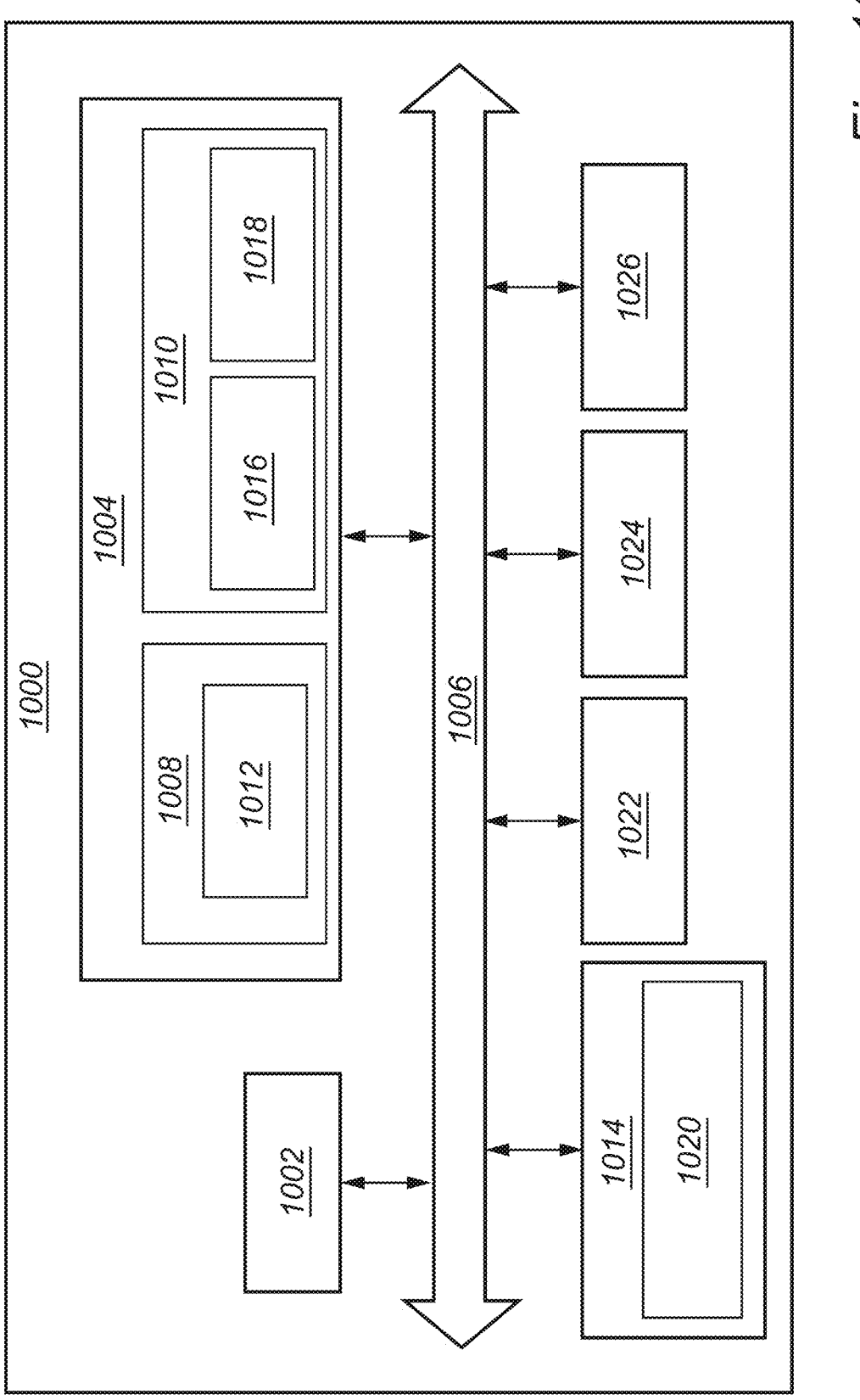
FIG. 10 is a schematic diagram of an exemplary computer system for implementing examples disclosed herein, according to an example.

FIG. 10 is a schematic diagram of a computer system 1000 for implementing examples disclosed herein. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or signal processing or for executing computer code stored in memory 1004. The processing circuitry 1002 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a controller or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system of a vehicle comprising processing circuitry configured to: send a verification request message to an electrical energy storage system of the vehicle, receive a response message from the electrical energy storage system that depends on the existence of a correct digital key in a memory of the electrical energy storage system; when the digital key is correctly verified, allow electrical systems of the vehicle to use the electrical energy storage system, when the digital key cannot be correctly verified, limit the use of the electrical energy storage system for the electrical systems of the vehicle.

Example 2: The computer system of example 1, wherein the electrical energy storage system includes a software reset function stored in the memory or accessible as a download file, the software reset function is configured to, upon being called, delete the digital key and a software access protection module from the memory.

Example 3: The computer system of example 2, wherein the software access protection module includes one or both of a further digital key and a user authentication block.

Example 4: The computer system of example 3, wherein the first digital key is a vehicle digital key configured to be verified by the vehicle processing circuitry, wherein the electrical energy storage system stores the further digital key that is verifiable for granting access to the memory.

Example 5: The computer system of example 4, wherein the further digital key is deleted when the software reset function is called.

Example 6: A vehicle comprising the computer system of any of examples 1-5, and an electrical energy storage system.

Example 7: A computer system of an electrical energy storage system comprising processing circuitry configured to:
  store, in a memory of the electrical energy storage system, a vehicle digital key verifiable by a vehicle processing circuitry, a software access protection module configured to protect unauthorized access to the memory, and a software reset function,
  receive a verification request message from the vehicle processing circuitry, send a response message to the vehicle processing circuitry, that: when the vehicle digital key is correctly verified, allows electrical systems of the vehicle to use the electrical energy storage system, when the vehicle digital key cannot be correctly verified, limits the use of the electrical energy storage system for the electrical systems of the vehicle.

Example 8: The computer system of example 7, the processing circuitry being configured to: receive a software reset signal that calls the software reset function, and in response, delete at least the vehicle digital key from the memory.

Example 9: The computer system of example 8, the processing circuitry being configured to: delete the vehicle digital key and the software access protection module from the memory.

Example 10: The computer system of any one of examples 7-9, wherein the software access protection module includes one or both of a further digital key and a user authentication block.

Example 11: The computer system of example 10, wherein the further digital key, the user authentication block, and the vehicle key are deleted when the software reset function is called.

Example 12: The computer system of any of examples 7-11, wherein the electrical energy storage system comprises a propulsion battery for the vehicle Example 13: An electrical energy storage system comprising a computer system of any one of examples 7-12.

Example 14: A computer-implemented method, comprising: sending, by a processing circuitry of a computer system, a verification request message to an electrical energy storage system of the vehicle, receiving, by the processing circuitry, a response message from the electrical energy storage system that depends on the existence of a correct digital key in a memory of the electrical energy storage system; when the digital key is correctly verified, allowing, by the processing circuitry, electrical systems of the vehicle to use the electrical energy storage system, when the digital key cannot be correctly verified, limiting, by the processing circuitry, the use of the electrical energy storage system for the electrical systems of the vehicle.

Example 15: The computer-implemented method of example 14, wherein the digital key is a vehicle digital key configured to be verified by the vehicle processing circuitry, wherein the electrical energy storage system stores a further digital key that is verifiable for granting access to the memory.

Example 16: A computer-implemented method comprising: storing, by a processing circuitry of a computer system, in a memory of the electrical energy storage system, a vehicle digital key verifiable by a vehicle processing circuitry, a software access protection module configured to protect unauthorized access to the memory, and a software reset function, receiving, by the processing circuitry, a verification request message from the vehicle processing circuitry, sending, by the processing circuitry, a response message to the vehicle processing circuitry, that: when the vehicle digital key is correctly verified, allows electrical systems of the vehicle to use the electrical energy storage system, when the vehicle digital key cannot be correctly verified, limits the use of the electrical energy storage system for the electrical systems of the vehicle.

Example 17: The computer-implemented method of example 16, comprising:
  receiving, by the processing circuitry, a software reset signal that calls the software reset function, and in response, deleting, by the processing circuitry, at least the vehicle digital key from the memory.

Example 18: The computer-implemented method of example 17, comprising:
  deleting, the vehicle digital key and the software access protection module from the memory.

Example 19: A computer program product comprising program code for performing, when executed by the processing circuitry, the method of any of examples 14-18.

Example 20: A non-transitory computer-readable storage medium comprising instructions, which when executed by the processing circuitry, cause the processing circuitry to perform the method of any of examples 14-18.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system of a vehicle comprising processing circuitry configured to:
   send a verification request message to an electrical energy storage system of the vehicle,
   receive a response message from the electrical energy storage system that depends on the existence of a correct digital key in a memory of the electrical energy storage system;
   when the digital key is correctly verified, allow electrical systems of the vehicle to use the electrical energy storage system,
   when the digital key cannot be correctly verified, limit the use of the electrical energy storage system for the electrical systems of the vehicle, wherein the electrical energy storage system includes a software reset function stored in the memory or accessible as a download file, the software reset function is configured to, upon being called, delete the digital key and a software access protection module from the memory.

2. The computer system of claim 1, wherein the software access protection module includes one or both of a further digital key and a user authentication block.

3. The computer system of claim 2, wherein the first digital key is a vehicle digital key configured to be verified by the vehicle processing circuitry, wherein the electrical energy storage system stores the further digital key that is verifiable for granting access to the memory.

4. The computer system of claim 3, wherein the further digital key is deleted when the software reset function is called.

5. A vehicle comprising the computer system of claim 1, and an electrical energy storage system.

6. A computer system of an electrical energy storage system comprising processing circuitry configured to:
   store, in a memory of the electrical energy storage system, a vehicle digital key verifiable by a vehicle processing circuitry, a software access protection module configured to protect unauthorized access to the memory, and a software reset function,
   receive a verification request message from the vehicle processing circuitry,
   send a response message to the vehicle processing circuitry, that:
   when the vehicle digital key is correctly verified, allows electrical systems of the vehicle to use the electrical energy storage system,
   when the vehicle digital key cannot be correctly verified, limits the use of the electrical energy storage system for the electrical systems of the vehicle,
   receive a software reset signal that calls the software reset function, and in response, delete at least the vehicle digital key from the memory.

7. The computer system of claim 6, the processing circuitry being configured to:
   delete the vehicle digital key and the software access protection module from the memory.

8. The computer system of claim 6, wherein the software access protection module includes one or both of a further digital key and a user authentication block.

9. The computer system of claim 8, wherein the further digital key, the user authentication block, and the vehicle key are deleted when the software reset function is called.

10. The computer system of claim 6, wherein the electrical energy storage system comprises a propulsion battery for the vehicle.

11. An electrical energy storage system comprising a computer system of claim 6.

12. A computer-implemented method, comprising:
   sending, by a processing circuitry of a computer system, a verification request message to an electrical energy storage system of the vehicle,
   receiving, by the processing circuitry, a response message from the electrical energy storage system that depends on the existence of a correct digital key in a memory of the electrical energy storage system;
   when the digital key is correctly verified, allowing, by the processing circuitry, electrical systems of the vehicle to use the electrical energy storage system,
   when the digital key cannot be correctly verified, limiting, by the processing circuitry, the use of the electrical energy storage system for the electrical systems of the vehicle, wherein the electrical energy storage system includes a software reset function stored in the memory or accessible as a download file, the software reset function is configured to, upon being called, delete the digital key and a software access protection module from the memory.

13. The computer-implemented method of claim 12, wherein the digital key is a vehicle digital key configured to be verified by the vehicle processing circuitry, wherein the electrical energy storage system stores a further digital key that is verifiable for granting access to the memory.

14. A computer-implemented method comprising:

storing, by a processing circuitry of a computer system, in a memory of the electrical energy storage system, a vehicle digital key verifiable by a vehicle processing circuitry, a software access protection module configured to protect unauthorized access to the memory, and a software reset function, receiving, by the processing circuitry, a verification request message from the vehicle processing circuitry, sending, by the processing circuitry, a response message to the vehicle processing circuitry, that:

when the vehicle digital key is correctly verified, allows electrical systems of the vehicle to use the electrical energy storage system, when the vehicle digital key cannot be correctly verified, limits the use of the electrical energy storage system for the electrical systems of the vehicle, and receiving, by the processing circuitry, a software reset signal that calls the software reset function, and in response, deleting, by the processing circuitry, at least the vehicle digital key from the memory.

15. The computer-implemented method of claim 14, comprising:

deleting, the vehicle digital key and the software access protection module from the memory.

16. A non-transitory computer-readable storage medium comprising instructions, which when executed by the processing circuitry, cause the processing circuitry to perform the method of claim 12.

* * * * *